US011931745B2

(12) United States Patent
Harbold et al.

(10) Patent No.: US 11,931,745 B2
(45) Date of Patent: Mar. 19, 2024

(54) GRINDING ROLL

(71) Applicant: Metso Outotec USA Inc., Waukesha, WI (US)

(72) Inventors: Keith Harbold, York, PA (US); Vadim Reznitchenko, Mechanicsburg, PA (US)

(73) Assignee: Metso Outotec USA Inc., Brookfield, WI (US)

( * ) Notice: Subject to any disclaimer, the term of this patent is extended or adjusted under 35 U.S.C. 154(b) by 62 days.

(21) Appl. No.: 17/355,460

(22) Filed: Jun. 23, 2021

(65) Prior Publication Data

US 2022/0410167 A1 Dec. 29, 2022

(51) Int. Cl.
*B02C 4/30* (2006.01)
*B02C 4/02* (2006.01)

(52) U.S. Cl.
CPC ................ *B02C 4/305* (2013.01); *B02C 4/02* (2013.01); *B02C 2210/02* (2013.01)

(58) Field of Classification Search
CPC .................................. B02C 4/305; B02C 4/02
USPC ........................................................ 241/293
See application file for complete search history.

(56) References Cited

U.S. PATENT DOCUMENTS

| | | | | |
|---|---|---|---|---|
| 2013/0277481 | A1* | 10/2013 | Harbold | B02C 4/305 241/295 |
| 2013/0284840 | A1 | 10/2013 | Packeisen et al. | |
| 2016/0318025 | A1* | 11/2016 | Frangenberg | B30B 3/005 |
| 2018/0318841 | A1 | 11/2018 | Udy et al. | |

FOREIGN PATENT DOCUMENTS

| | | | | |
|---|---|---|---|---|
| CN | 104254400 A | 12/2014 | | |
| EP | 2756886 B1 | 7/2014 | | |
| WO | 2008098951 A1 | 8/2008 | | |
| WO | WO-2014071173 A2 * | 5/2014 | | B02C 4/305 |

OTHER PUBLICATIONS

International Search Report and Written Opinion for International Application No. PCT/US2022/034141, dated Oct. 18, 2022.

Office Action for corresponding Chinese Utility Model Application No. 202221530389.7, dated Oct. 10, 2022.

* cited by examiner

*Primary Examiner* — Matthew Katcoff
*Assistant Examiner* — Mohammed S. Alawadi
(74) *Attorney, Agent, or Firm* — Andrus Intellectual Property Law, LLP

(57) ABSTRACT

A grinding roll including a roll body having a cylindrical outer surface extending axially between a pair of opposite ends and a side groove formed at each end of the roll body. The side groove includes a support shoulder recessed from the cylindrical outer surface and/or from surfaces of the opposite ends of the roll body. The grinding roll includes an edge ring including a plurality of spaced receiving cavities and a plurality of wear members. Each wear member is received and retained in at least one of the receiving cavities of the edge ring. The wear members are positioned along the edge ring to define an edge of the grinding roll, and the edge ring is received within each side groove. The wear members are arranged to provide a wear protecting surface which is angled in relation to the cylindrical outer surface of the roll body. The angled wear protecting surface prevents excessive build-up of material on the grinding roll and reduces the need for maintenance.

13 Claims, 8 Drawing Sheets

GRINDING ROLL

TECHNICAL FIELD OF THE DISCLOSURE

The present disclosure generally relates to a grinding roll, an edge ring segment for a grinding roll, and a grinding assembly including a pair of grinding rolls for comminution of materials, which provide improved wear protection.

BACKGROUND

Grinding rolls are used in roller crushers to grind material such as rock, ore, cement, clinker and other hard materials, by drawing the material into a roller nip formed by two counter-rotating grinding rolls that are separated from each other and subject to a pressurized force. The material being ground passes through the nip formed between the two grinding rolls. The surface of the grinding rolls is thus subjected to a high level of wear.

One type of roller crusher is called high pressure grinding rolls or high pressure roller crushers. This type of roller crusher uses a crushing technique called interparticle crushing. Here, the material to be crushed or pulverized is crushed not only by the crushing surface of the grinding rolls, but also by particles in the material to be crushed, hence the name interparticle crushing. In order to achieve a constant crushing result along the entire width of the grinding rolls, a flange can be provided at each end of one of the rolls of the roller crusher, such to prevent material from escaping over the edges of the rolls, which otherwise leads to reduced crushing result in these areas. Such a flanged roller crusher is disclosed in EP2756886.

A general problem associated with existing flanged roller crushers is that during operation, material is built up in the corner between the cylindrical outer surface of the grinding roll and the inner surface of the flange. To prevent the edge of the opposite, non-flanged, roll and the flange from being deformed and damaged due to local loads, such build-up of material must be removed with a scraper regularly. This requires frequent operational halts of the roller crusher, which is not desirable.

SUMMARY

An object of the present disclosure is to provide an improvement of the prior art. More particularly, it is an object of the present disclosure to provide a grinding roll which requires less maintenance.

Another object of the present disclosure is to provide a grinding assembly which requires less maintenance.

Another object of the present disclosure is to provide an edge segment which provides improved wear protection.

These and other objects as well as advantages that will be apparent from the following description of the present disclosure are achieved in full or at least in part by the grinding roll, grinding assembly, and edge segment according to the independent claims.

According to a first aspect of the disclosure, these and other objects are achieved, in full or at least in part, by a grinding roll comprising a roll body having a cylindrical outer surface extending axially between a pair of opposite ends, and a side groove formed at each end of the roll body. The side groove includes a support shoulder recessed from the cylindrical outer surface and/or from surfaces of the opposite ends of the roll body. The grinding roll further comprises an edge ring including a plurality of spaced receiving cavities, and a plurality of wear members, each wear member being received and retained in at least one of the receiving cavities of the edge ring, wherein the wear members are positioned along the edge ring to define an edge of the grinding roll, and wherein the edge ring is received within each side groove. Further, the plurality of wear members is arranged to provide a wear protecting surface which is angled in relation to the cylindrical outer surface of the roll body.

According to this first aspect, providing angled wear protecting surfaces at the ends of the grinding roll prevents build-up of material thereon. With no excessive build-up of material on the roll edge, scraping the roll surface is not needed and therefore, time required for maintenance of the grinding roll is reduced.

According to an embodiment, the edge ring is formed from a plurality of edge ring segments. The edge ring segments are in this embodiment joined in an end-to-end or interlocking configuration, to provide the edge ring. This allows for reduced tension in the edge ring. Providing a plurality of edge ring segments further facilitates service of the grinding roll since a single segment containing wear or any other deficiency may be exchanged, if needed, without having to replace the entire edge ring. This is also advantageous in that it facilitates manufacturing and mounting of the edge ring. Preferably, the edge ring is removably and replaceably attached to the grinding roll by means of connectors.

According to an embodiment, the side grooves are arranged to provide the support shoulders recessed from each of the opposite end surfaces of the roll body. Thereby, support for the edge ring is provided.

According to an embodiment, the side grooves are arranged to provide the support shoulders recessed from the cylindrical outer surface as well as from each opposite end surface of the roll body. This provides good support for the edge ring both in axial and radial direction.

According to an embodiment, each of the wear members has an angled outer surface. Providing an angled outer surface of the wear members leads to increased pressure towards the ends of the grinding roll, which prevents build-up of material at the surface thereat. Preferably, each wear member is removably and replaceably arranged in a respective cavity of the edge ring, allowing replacement of single wear members when worn to an unacceptable extent. Wear members are generally made of a hard material, such as tungsten carbide or other hard metal or composite materials which provide good resistance to wear under high loads.

According to an embodiment, the angled outer surface of each of the wear members of the grinding roll slopes downwards in a direction towards the end of the roll body. In this embodiment, a top portion of the angled outer surface of the wear member is aligned with the cylindrical outer surface of the grinding roll, whereas a bottom portion of the angled outer surface is at a height radially inwards of the cylindrical outer surface of the grinding roll and aligned with the end surface of the roll body, the angled outer surface of the wear member thus sloping downwards in the direction towards the end of the roll body.

According to an embodiment, the grinding roll further comprises a flange ring arranged adjacent the edge ring and attached to an end surface of the roll body and/or to the edge ring, the flange ring having an outer edge that extends radially past the outer surface of the roll body. This prevents material from falling out at the end of the grinding roll and, thus, provides an increased crushing performance along the entire width of the grinding roll.

According to an embodiment, the flange ring is formed of a plurality of flange ring sections positioned adjacent to each other. This is advantageous in that both the manufacturing and mounting of the flange will be facilitated. Preferably, the flange ring sections are removably and replaceably attached to the grinding roll. This further allows for efficient replacement of any flange section when needed without requiring replacement of the entire flange ring. The flange may be attached to the grinding roll by means of an adhesive, bolting, screwing, welding, brazing or any other suitable fastening technique.

According to an embodiment of a grinding roll having a flange ring, the angled outer surface of each of the wear members partially protrudes with respect to the cylindrical outer surface of the grinding roll and slopes in a direction towards a center of the roll body. This provides a projecting angled wear surface which, in conjunction with an opposing roll comprising an inversely angled, recessed wear surface, increases the pressure at the ends of the grinding rolls, thereby preventing build-up of material in the corner between the surface of the grinding roll and the flange.

According to an embodiment of a grinding roll without a flange ring, the plurality of wear members is provided in a stepped configuration, each wear member having a first portion and at least a second portion, wherein the first portion is arranged to be aligned with and adjacent an end of the cylindrical outer surface, and the at least second portion is aligned with an end surface of the roll body and arranged radially inwards of the first portion. Thus, the second portion provides a step arranged radially inwards of the first portion. More particularly, the first portion provides a surface which is aligned with and adjacent the cylindrical outer surface of the roll body, and the second portion provides a surface which extends axially from the first portion at a height radially inwards thereof. The stepped configuration provides a pocket which is open outwardly both radially and axially at the ends of the grinding roll, in which material can build up to form an autogenous layer during operation. The autogenous layer thus formed repeats the shape of material build-up on an opposite grinding roll at the corners between the roller surface and the inner surface of the flange. Due to an initially lower pressure at the ends of the grinding rolls, the shape of material build-up will be angled, thus providing angled wear protection surfaces. In addition to protecting the grinding roll from uneven excessive material build-up at the roll ends, the angled wear protection surface of this embodiment protects the wear members from wearing. According to an embodiment, the stepped configuration of the wear members is achieved by providing substantially L-shaped wear members.

According to an embodiment of a grinding roll without a flange ring, the plurality of wear members is arranged in at least two rows on the edge rings, a first row being aligned with and adjacent an end of the cylindrical outer surface, and a second row being aligned with an end surface of the roll body and arranged radially inwards of the first row. Providing the plurality of wear members in two rows allows optimizing the amount of material used for wear members, which is advantageous considering that such material is more costly than that used for the edge ring. Furthermore, should a single wear member need replacement, it can be efficiently exchanged.

According to a second aspect of the disclosure, these and other objects are also achieved, in full or at least in part, by a grinding assembly for comminution of material comprising generally parallel first and second grinding rolls arranged to rotate in opposite directions, towards each other, and separated by a gap. Each of the first and second grinding rolls comprises a roll body having a cylindrical outer surface extending axially between a pair of opposite ends, and a side groove formed at each end of the roll body. The side groove includes a support shoulder recessed from the cylindrical outer surface and/or from surfaces of the opposite ends of the roll body. Each first and second grinding rolls further comprises an edge ring including a plurality of spaced receiving cavities and a plurality of wear members, each wear member being received and retained in at least one of the receiving cavities of the edge ring, wherein the wear members are positioned along the edge ring to define an edge of the grinding roll, wherein the edge ring is received within each side groove, and wherein the plurality of wear members of each of the first and second grinding rolls is arranged to provide a wear protecting surface which is angled in relation to the cylindrical outer surface of the respective roll body. The first grinding roll further comprises a flange ring at each opposite end, said flange rings each having an outer edge that extends radially past the cylindrical outer surface of the roll body. The wear protecting surface of the first grinding roll is inversely angled with respect to the wear protecting surface of the second grinding roll, such to provide an angled interface therebetween. According to this second aspect, the angled wear protecting surfaces provide increased pressure at the ends between the two grinding rolls, preventing excessive and uneven material build-up in this area. This is advantageous in that it increases the service life of the grinding assembly.

According to an embodiment, the plurality of wear members of the first grinding roll is arranged to provide an angled wear protection surface which partly protrudes beyond the cylindrical outer surface of the roll body and which slopes downwards in a direction towards a center of the roll body, and the plurality of wear members of the second grinding roll is arranged to provide an angled wear protection surface which does not protrude beyond the cylindrical outer surface of the roll body and which slopes radially downwards in a direction towards the end of the roll body. The thus inversely provided angled wear protection surfaces of the first and second grinding rolls eliminate local load at the ends of the rolls due to uneven material build-up. This prolongs the service life of the grinding assembly, reducing downtime needed for maintenance.

According to an embodiment, the plurality of wear members comprises the angled wear protection surface of the first and second grinding rolls. Preferably, the wear members are removably arranged at the edge ring such to be easily exchangeable when needed.

According to an embodiment, the plurality of wear members of the first grinding roll is aligned with the cylindrical outer surface of the roll body and the plurality of wear members of the second grinding roll is provided in a stepped configuration. The plurality of wear members of the second grinding roll is further arranged to provide a first portion and at least a second portion, wherein the first portion is arranged to be aligned with and adjacent an end of the cylindrical outer surface, and the at least second portion is aligned with an end surface of the roll body and arranged radially inwards of the first portion. Furthermore, the second portion comprises a surface protruding from the first portion in an axial direction of the roll body, at a point radially inwards of the first portion. The stepped configuration of the first and second portions of the plurality of wear members provides a pocket at the ends of the second grinding roll which is open axially and radially. The pocket may hold material to build up an autogenous layer repeating the shape of material build-up on the first grinding roll at the corner between the cylindrical outer surface and the inner surface of the flange. Due to the decreasing pressure towards the end of the grinding roll, the shape of such material build-up is angled. Thereby, the stepped configuration of the wear members of the second roll provides an angled wear protection surface through the autogenous layer built thereon. In addition to preventing uneven and excessive material build-up at the ends of the grinding rolls, the angled wear protecting surface made up of the autogenous layer reduces wear of the wear parts during operation of the grinding assembly.

According to an embodiment, the plurality of wear members of the second grinding roll is arranged in at least two rolls on the edge rings, a first row being aligned with and adjacent an end of the cylindrical outer surface forming the first portion, and a second row being aligned with an end surface of the roll body and arranged radially inwards of the first row forming the second portion.

According to a third aspect of the disclosure, there is provided a grinding roll comprising a roll body having a cylindrical outer surface extending axially between a pair of opposite ends, and a side groove formed at each end of the roll body, the side groove including a support should be recessed from the cylindrical outer surface and/or from surfaces of the opposite ends of the roll body. The grinding roll further comprises an edge ring including a plurality of spaced receiving cavities and a plurality of wear members, each wear member being received and retained in at least one of the receiving cavities of the edge ring, wherein the wear members are positioned along the edge ring to define an edge of the grinding roll, wherein the edge ring is received within each side groove, and wherein the plurality of wear members is arranged in a stepped configuration, the plurality of wear members of the second grinding roll being arranged to provide a first portion and at least a second portion. The first portion is arranged to be aligned with and adjacent an end of the cylindrical outer surface, and the at least second portion is aligned with an end surface of the roll body and arranged radially inwards of the first portion. Thus, a stepped configuration having two steps is provided. The wear members may alternatively be arranged to provide a third portion providing a third step of the stepped configuration.

According to an embodiment, the plurality of wear members is arranged in at least two rows on the edge rings, a first row being aligned with and adjacent an end of the cylindrical outer surface forming the first portion, and a second row being aligned with an end surface of the roll body and arranged radially inwards of the first row forming the second portion. According to an embodiment, a third row is provided between the first and second rows and arranged such to provide a further step to the stepped configuration.

According to a fourth aspect of the disclosure, there is provided an edge ring segment arrangeable at a grinding roll along an edge thereof, the edge ring segment comprising a plurality of spaced receiving cavities and a plurality of wear members, each wear member being received and retained in at least one of the receiving cavities of the edge ring segment, wherein the wear members are positioned along the edge ring segment to define an edge of the grinding roll when arranged thereat, and wherein the plurality of wear members is arranged in a stepped configuration such that, when the edge ring segment is arranged at a grinding roll having a cylindrical outer surface extending between a pair of opposing ends, a first portion of each wear member comprises a surface which is aligned with and adjacent an end of the cylindrical outer surface of the grinding roll and a second portion of each wear member protrudes axially from the first portion, is aligned with an end surface of the grinding roll, and is arranged radially inwards of the first portion.

The stepped configuration of the wear members provides a pocket to hold material and build an autogenous layer on the edge ring segment. The shape of the autogenous layer will repeat the shape of the build up on an opposing grinding roll end, providing an angled wear protecting surface. This is advantageous in that the autogenous layer reduces wear of the wear members during operation. The stepped configuration can be achieved in a number of ways. For example, according to an embodiment of the edge ring segment, each wear member is L-shaped to provide a stepped configuration having two steps. In other, alternative, embodiments, the wear members are arranged to provide a stepped configuration with three or more steps.

According to an embodiment, the plurality of wear members is arranged in at least two rows on the edge ring segment, such that, when the edge ring segment is arranged at a grinding roll having a cylindrical outer surface extending between a pair of opposing ends, a first row is aligned with and adjacent an end of the cylindrical outer surface of the grinding roll forming the first portion, and a second row is aligned with an end surface of the grinding roll and arranged radially inwards of the first row forming the second portion. This embodiment provides efficient use of the material used for the wear members, which material is generally more costly than that used for the edge ring segment. In further, alternative embodiments, the plurality of wear members is arranged in three or more rows on the edge ring segment.

Other objectives, features and advantages of the present disclosure will appear from the following detailed description, from the attached claims, as well as from the drawings. It is noted that the disclosure relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising", and variations of that term are not intended to exclude other additives, components, integers, or steps.

BRIEF DESCRIPTION OF THE DRAWINGS

The disclosure will be described in more detail with reference to the appended schematic drawings, which show examples of embodiments of the disclosure.

DETAILED DESCRIPTION

Figure 1:
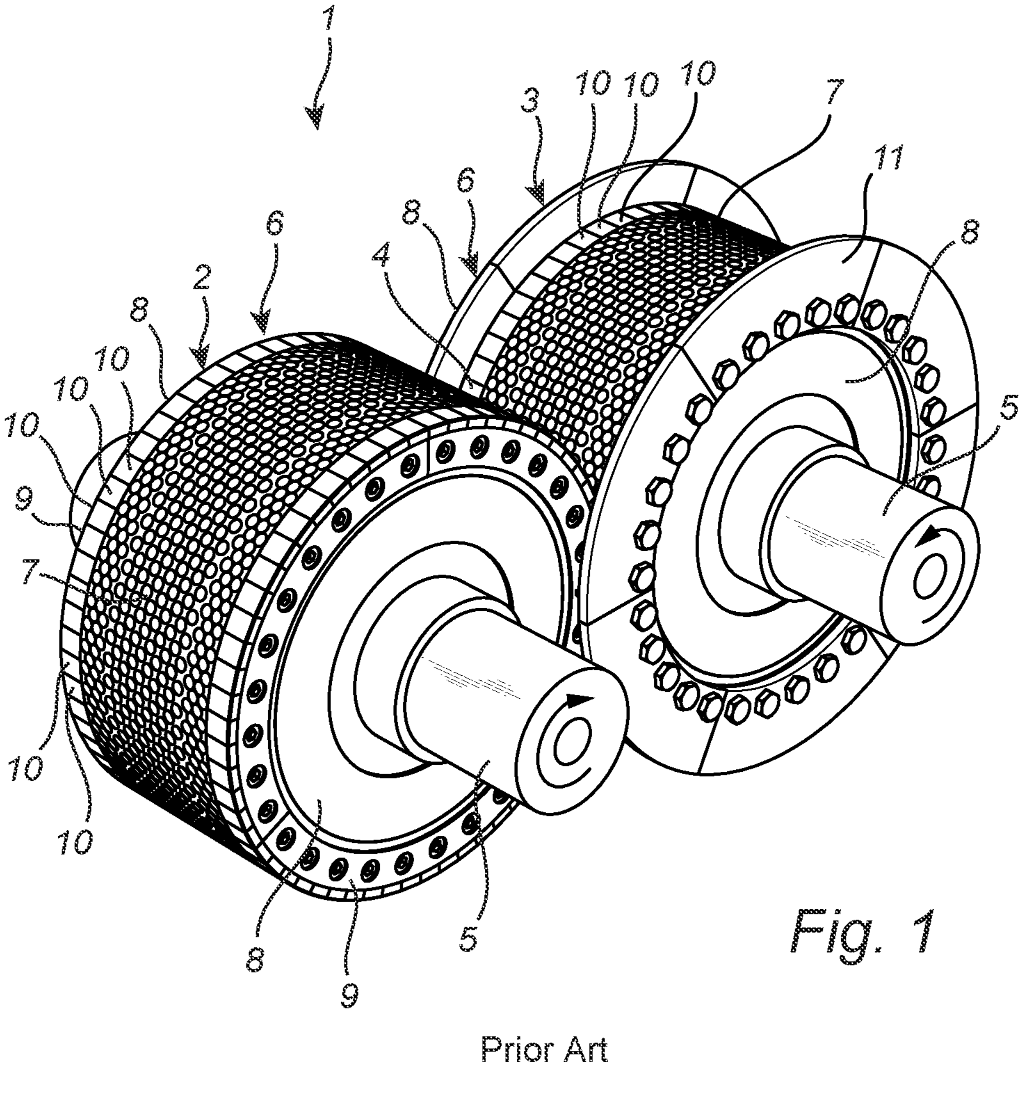
Fig. 1 Prior Art
FIG. 1 is a perspective view of a grinding assembly known in the art.

The present disclosure will now be described more fully hereinafter with reference to the accompanying drawings, in which currently preferred embodiments of the disclosure are shown. The present disclosure may, however, be embodied in many different forms and should not be construed as limited to the embodiments set forth herein; rather, these embodiments are provided for thoroughness and completeness, and to fully convey the scope of the disclosure to the skilled addressee. Like reference characters refer to like elements throughout.

FIG. 1 shows a grinding assembly 1 known in the art for pressure comminution of material such as rock, ore, cement, clinker, and other hard materials. The grinding assembly 1 includes a pair of grinding rolls 2, 3 that are positioned adjacent to each other to define an infeed nip 4. During operation, the grinding rolls 2, 3 rotate toward each other according to the arrows such that material is drawn into the infeed nip 4. The grinding rolls 2, 3 are each respectively rotatable about a shaft 5. A mechanical source of pressure (not shown) bias the grinding rolls 2, 3 toward each other such that the source of pressure crushes the material passing through the infeed nip 4.

Each grinding roll 2, 3 comprises a roll body 6 having a cylindrical outer surface 7 which extends axially between two opposite ends 8. Each roll body 6 is rotatable about a longitudinal axis that passes through the center of the shaft 5. Each roll body 6 further comprises edge rings 9 arranged at each end of the grinding rolls 2, 3. Each edge ring 9 comprises a plurality of wear members 10 positioned along the respective edge ring to define an edge of the grinding roll 2, 3. Typically, and as shown in FIG. 1, the wear members provide a flat surface edge of the grinding rolls 2, 3. As shown in FIG. 1, one of the grinding rolls 3 further comprises a flange ring 11 having an outer edge that extends radially past the outer surface of the roll body of the grinding roll 3, and positioned axially outward of the roll body 6 of the grinding roll 2. As initially described, a problem with this type of grinding assemblies is that material tend to build up at the corner 12 (see FIG. 2) between the surface of the wear members and the inner surface of the flange. Such material build-up generates increased local loads in this area during operation, which may cause wear members 10 of the non-flanged grinding roll 2 or the flange 11 to be damaged or deformed. To avoid an excessive material build-up, scrapers are used at certain intervals to remove the built-up material in this corner 12.

Figure 3:
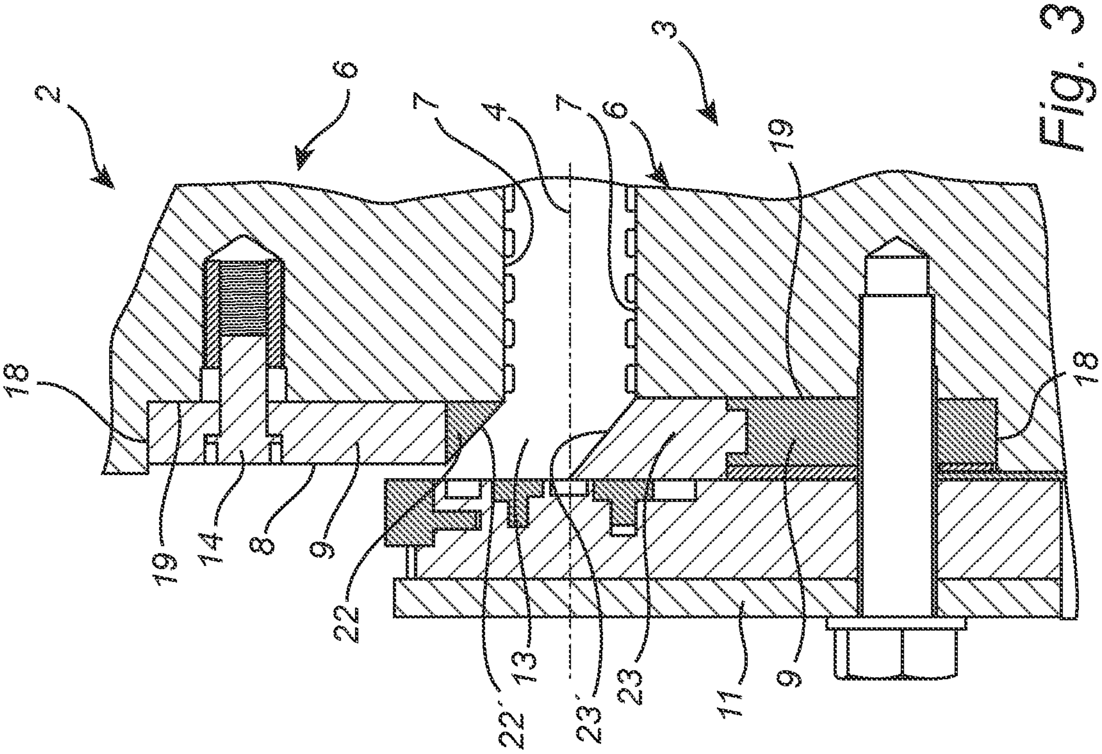
FIG. 3 is a section view of an end portion of a grinding roll and a grinding assembly in accordance with an embodiment of the present disclosure.

The inventor has surprisingly found that by providing a wear protecting surface which is angled in relation to the cylindrical outer surface of the roll body, such excessive material build-up is, however, prevented. FIG. 3 shows an embodiment of an inventive grinding assembly accordingly. In this embodiment, the wear members 22, 23 of the grinding rolls 2, 3 has angled outer surfaces 22', 23'. As shown, the wear member 22 of the non-flanged grinding roll 2 has an angled outer surface which slopes in a direction towards the end 8 of the roll body 6. More particularly, the angled outer surface 22' slopes from an end of the wear member 22 which is adjacent and aligned with the cylindrical outer surface 7 downwards to a diagonally opposing end of the wear member 22 which is adjacent and aligned with the end 8 of the roll body 6, thus providing an angled surface extending there between.

On the other side of the infeed nip 4, the wear member 23 of the flanged roll 3 partially protrudes with respect to the cylindrical outer surface 7 of the grinding roll 3 and slopes in a direction towards the center of the roll body 6, providing an angled wear surface 23'. More particularly, the angled outer surface 23' slopes from an end of the wear member 23 which is aligned with the end 8 of the roll body 6 and which is at a height radially outwards of the cylindrical outer surface 7 of the roll body 6 to a diagonally opposing end of the wear member 23 which is aligned with and adjacent the cylindrical outer surface 7. Thus, the two angled wear surfaces 22', 23' are inversely angled with respect to each other, providing an angled interface 13 there between.

Figure 4:
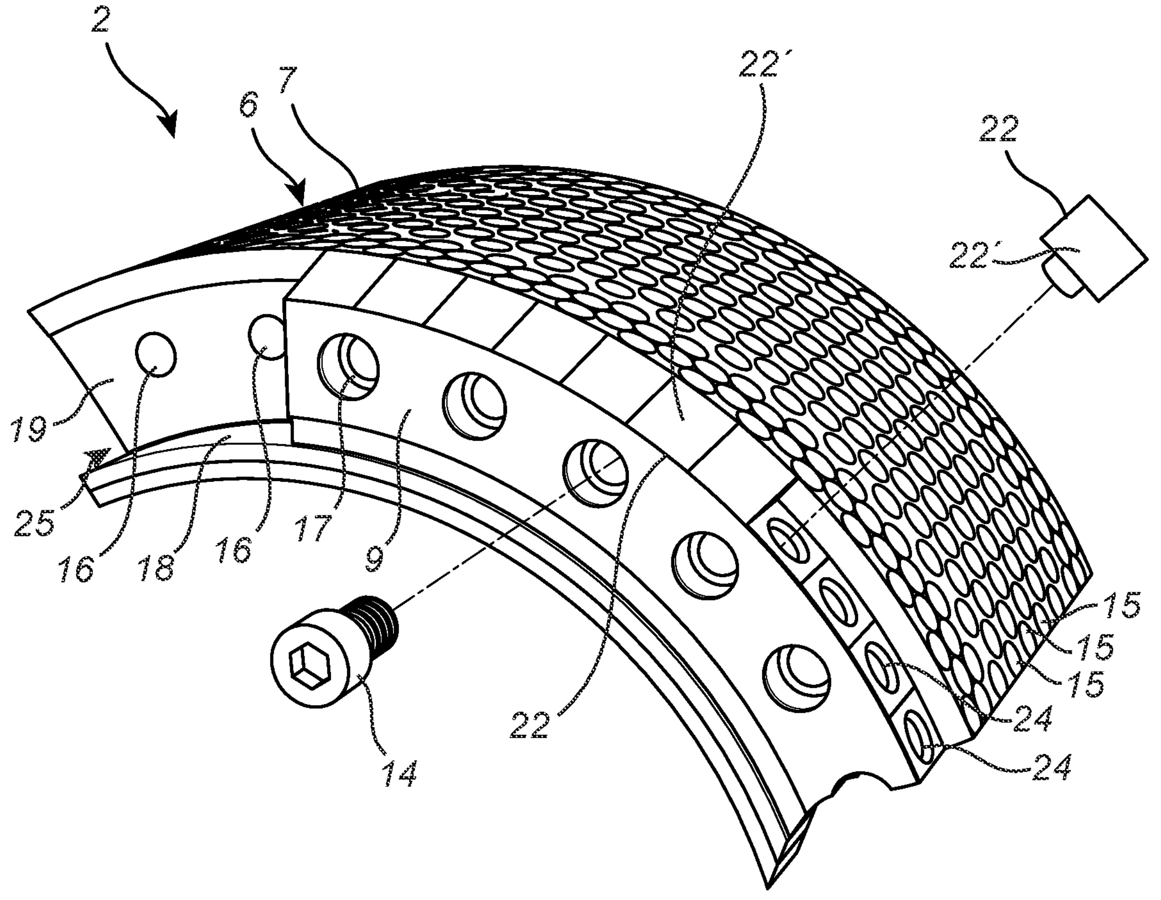
FIG. 4 is a magnified, partially exploded view of a grinding roll in accordance with an embodiment of the present disclosure.

FIG. 4 shows a portion of the grinding roll 2. As illustrated herein, the plurality of wear members 22 is positioned in an end-to-end configuration to define the edges of the grinding roll 2. In an alternative embodiment, the wear members interlock with each other to form the edge of the grinding roll 2. The wear members 23 of the grinding roll 3 may be provided in the same manner, i.e. in an end-to-end configuration or in an interlocking configuration to form the edge of the grinding roll 3.

FIG. 4 further shows that each wear member 22 includes an attachment section 20 that is received and retained within one of the receiving cavities 24 formed on the edge ring 9. Although the wear members 22 are each shown being received and retained in one of the receiving cavities 24 the wear members 22 may be configured to include multiple depending sections that would be received in adjacent receiving cavities 24 spaced along the edge ring 9. Thus, in one embodiment one wear member 22 may have multiple attachment sections 20 to be received in adjacent receiving cavities 24.

The edge ring 9, in turn, is received and retained within a side groove 25 formed at the transition between the outer cylindrical surface 7 and the end surface 8 of the roll body 6. The side groove 25 is defined by the support shoulder 18 and the inner wall 19. The inner wall comprises a plurality of bores 16 that each receive a threaded shaft of a connector 14, for fastening the edge ring 9 to the roll body 6. Correspondingly, the edge ring 9 comprises bores 17 for receiving a head portion of the connector 14. The connector 14 is generally recessed from the end surface of the grinding roll 2 providing a compact fastening means for the edge ring 9. The edge ring 9 of the grinding roll 3 may be arranged at the roll body 6 in the same manner. The recessed arrangement of the connector 14 allows positioning the flange ring 11 axially adjacent to the edge ring 9 of the grinding roll 3.

Figure 2:
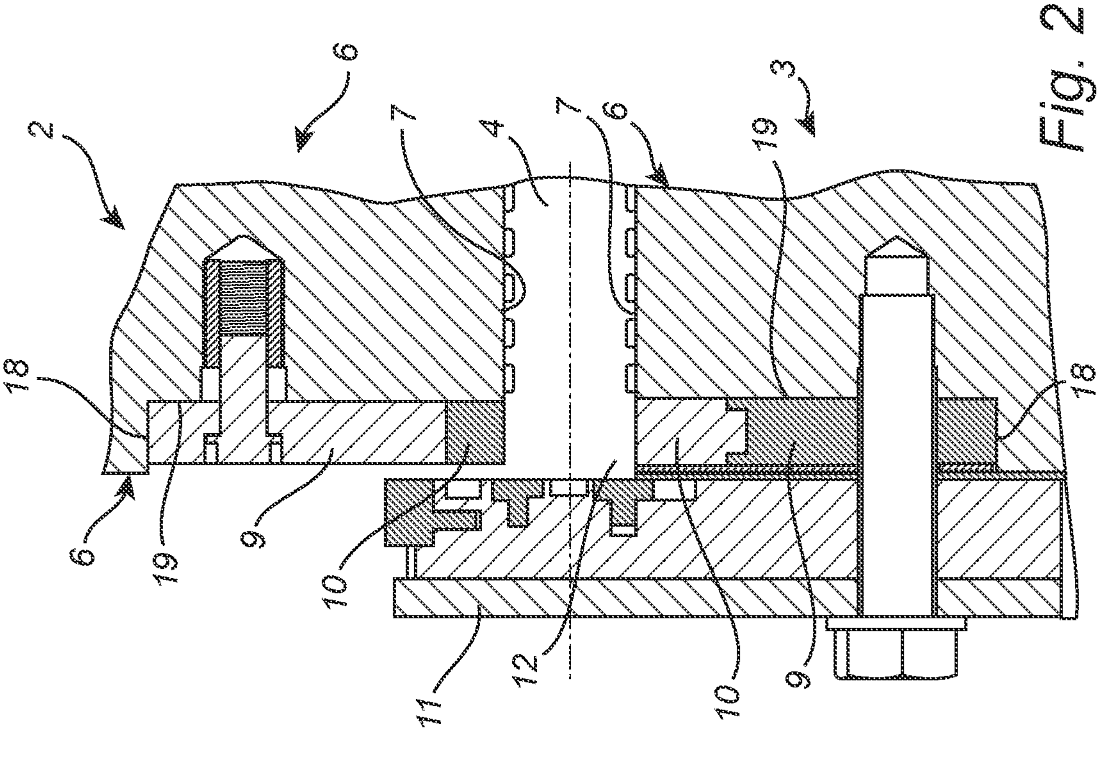
Fig. 2 Prior Art
FIG. 2 is a section view of an end portion of a grinding assembly known in the art.

FIG. 4, as well as FIGS. 1-3, further shows that the cylindrical outer surface 7 of the grinding rolls 2, 3 are arranged with wear bodies in form of studs 15 arranged in receiving bores on the cylindrical outer surface 7. However, the cylindrical outer surface may also be arranged with other type of wear protection providing a smooth cylindrical outer surface.

Figure 5:
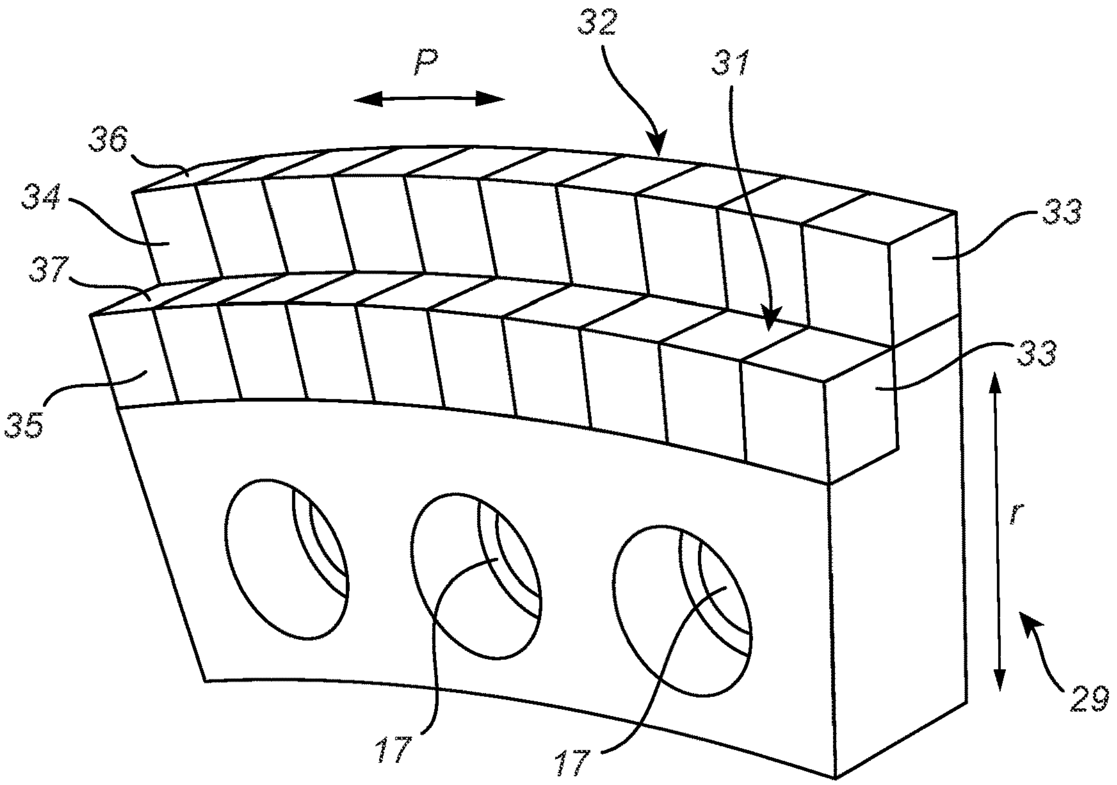
FIG. 5 is a schematic perspective view of an edge ring segment in accordance with an embodiment of an aspect of the disclosure.

With reference to FIG. 5, an edge ring segment 29 is shown. The edge ring segment 29 comprises bores 17 for receiving a fixing means, such as connector 14 of FIG. 4, to fasten the edge ring segment to a grinding roll. The edge ring segment 29 is shaped such that when arranging a plurality of edge ring segments 29 in an end-to-end configuration, an edge ring is provided. The edge ring segment 29 can therefore be referred to as having a radial extension r parallel with the radial extension of the grinding roll when mounted thereat, and a peripheral extension p. The edge ring segment 29 comprises a plurality of wear members 33 received and retained in spaced receiving cavities of the edge ring segment (not shown in FIG. 5). The wear members 33 are positioned along the edge ring segment 29 to define an edge of the grinding roll when arranged thereat. The wear members are here arranged in a stepped configuration. More particularly, the wear members 33 shown in FIG. 5 provide a first portion 34 and a second portion 35. The first portion 34 comprises a surface 36 providing a first step which forms an edge of the edge ring segment 29 extending along the peripheral extension p thereof. The second portion 35 comprises a surface 37 providing a second step which forms an edge arranged radially inwards of the first step and which extends in the peripheral extension p of the edge ring segment 29. The first and second portions 34, 35 are here made out of first and second rows 32, 31 of wear members 33. That is, the wear member 33 are arranged at the edge ring segment 29 in first and second rows 32, 31 arranged at different radial heights of the edge ring segment.

Figure 6:
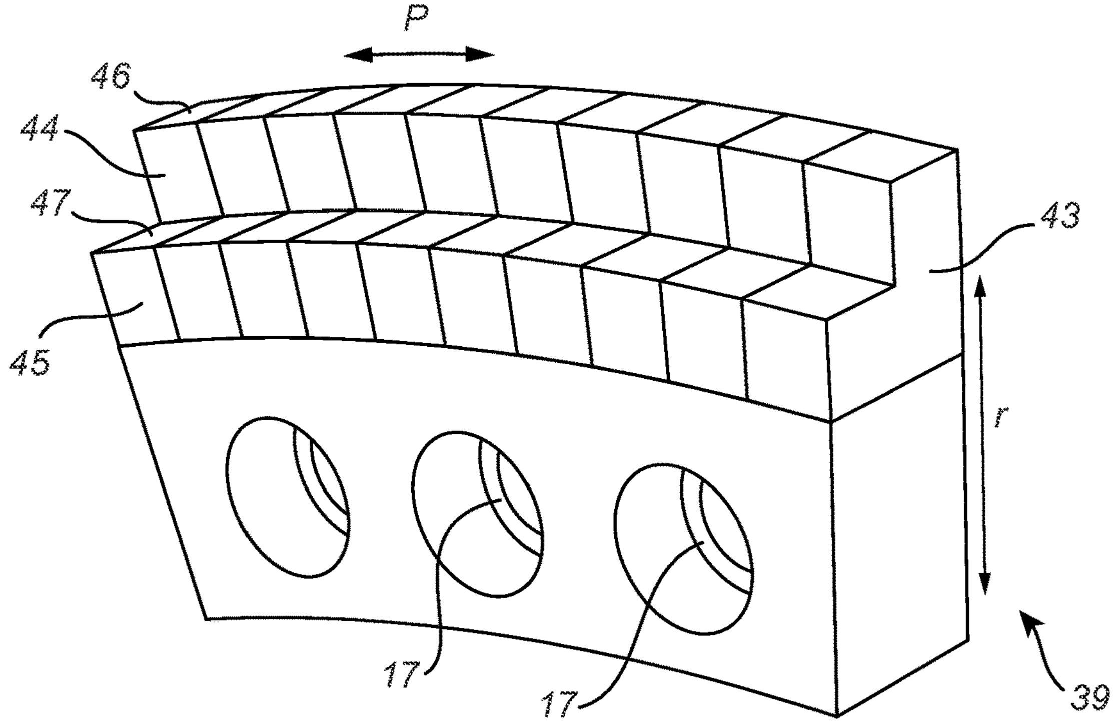
FIG. 6 is a schematic perspective view of an edge ring segment according to another embodiment of the disclosure.

FIG. 6 illustrates another edge ring segment 39 comprising wear members 43 provided in a stepped configuration. Here, each wear member has an L-shape. The wear members 43 are arranged in an end-to-end configuration and provide a first and a second portion 44, 45. As for the embodiment shown in FIG. 5, the first portion 44 comprises a surface 46 providing a first step which forms an edge of the edge ring segment 29 extending along the peripheral extension p thereof. The second portion 45 comprises a surface 47 providing a second step which forms an edge arranged radially inwards of the first step and which extends in the peripheral extension p of the edge ring segment 29.

Figure 7C:
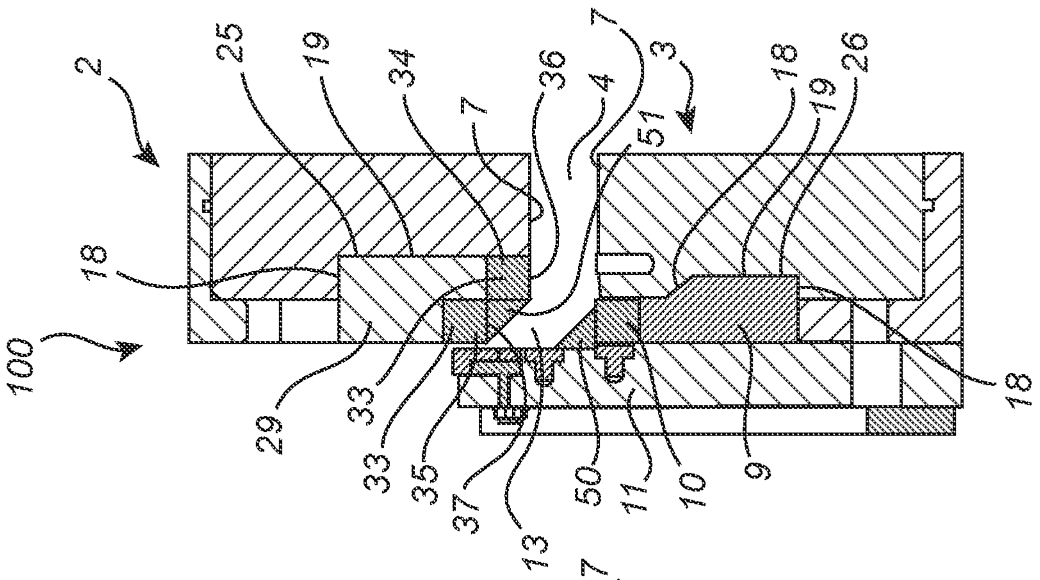
FIGS. 7*a-c* are section views of an end portion of a grinding roll and a grinding assembly in accordance with an embodiment of the disclosure.
Figure 7B:
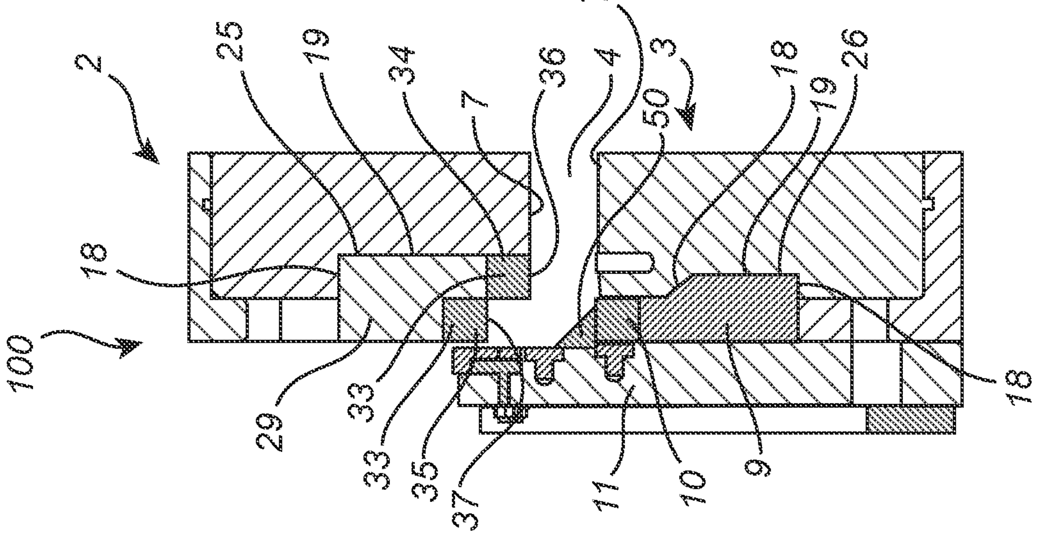
Figure 7A:
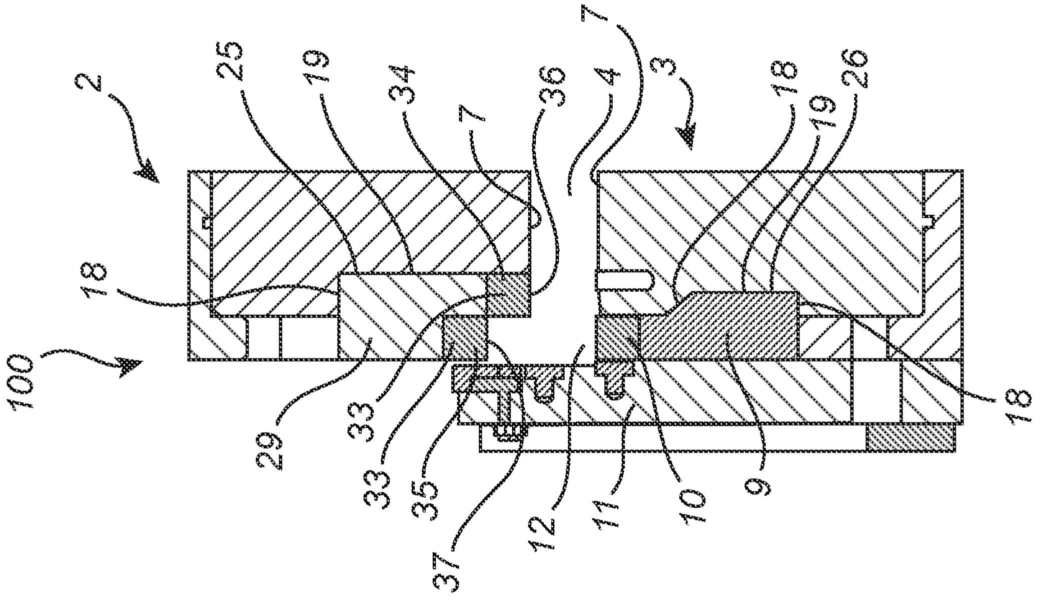

Referring now to FIGS. 7A-C, a grinding assembly comprising first and second grinding rolls 2, 3 wherein the first grinding roll 2 comprises edge ring segments as that shown in FIG. 5 is illustrated during its operation. In FIG. 7A, the grinding assembly is shown prior to operation. In this embodiment, the second roll 3 comprises the flange 11, arranged thereat as previously described. Furthermore, the edge ring 9 is arranged at the grinding roll 3 in a side groove 26 providing a support shoulder 18 recessed from the end surface of the roll body 6. The edge ring 9 of the second grinding roll 3 further comprises wear members 10 having a flat surface substantially aligned with the cylindrical outer surface 7 of the grinding roll 3. The first grinding roll 2 comprises an edge ring made up of a plurality of edge ring segments 29 of FIG. 5. The edge ring segments 29 are received in a side groove 25 as shown in FIG. 4, providing a support shoulder 18 recessed from the cylindrical outer surface 7 as well as from the end surface 8 of the roll body 6.

During operation, material build-up 50 will form in the corner between the flat surface of the wear members 10 and the inner surface of the flange 11 of the second grinding roll 3, as shown in FIG. 7B. During further operation, the stepped configuration of the wear members 33 of the first grinding roll 2 provides a pocket to hold material and build an autogenous layer 51 which copies the shape of the material build-up 50 on the second grinding roll 3. Due to the decreasing pressure between the grinding rolls 2, 3 towards the ends thereof, the shape of the material build-up or autogenous layer 50, 51 is generally triangular in cross-section. The autogenous layer protects the surface of the wear members 10 of the second grinding roll 3 and the surface 37 of the second portion 35 of the wear members 33 of the second grinding roll 3 from wear. The so formed autogenous layers 50, 51 thus provide angled wear protecting surfaces of the first and second grinding roll 2, 3.

Figure 8B:
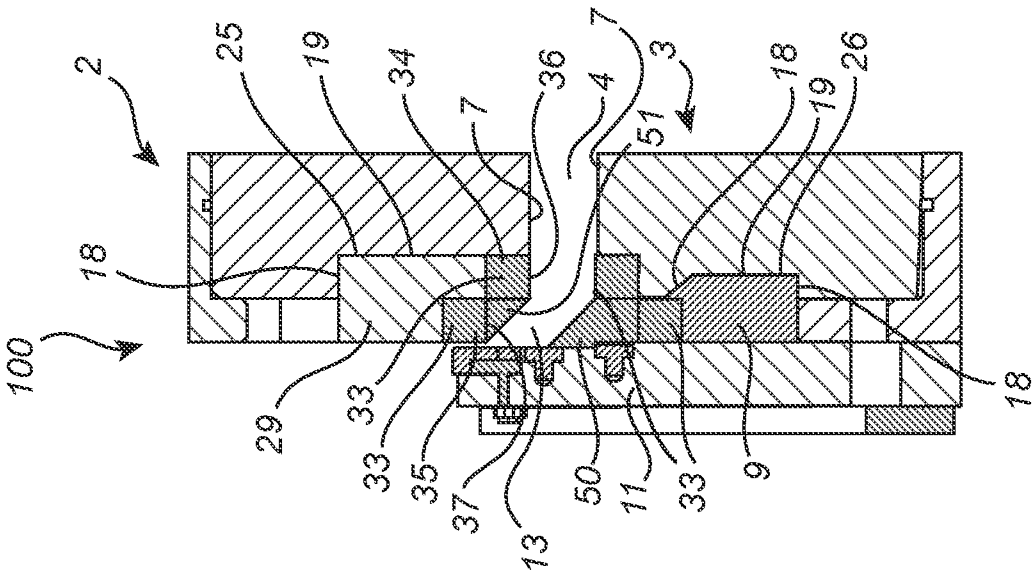
FIGS. 8*a-b* are section views of an end portion of a grinding roll and a grinding assembly in accordance with an embodiment of the disclosure.
Figure 8A:
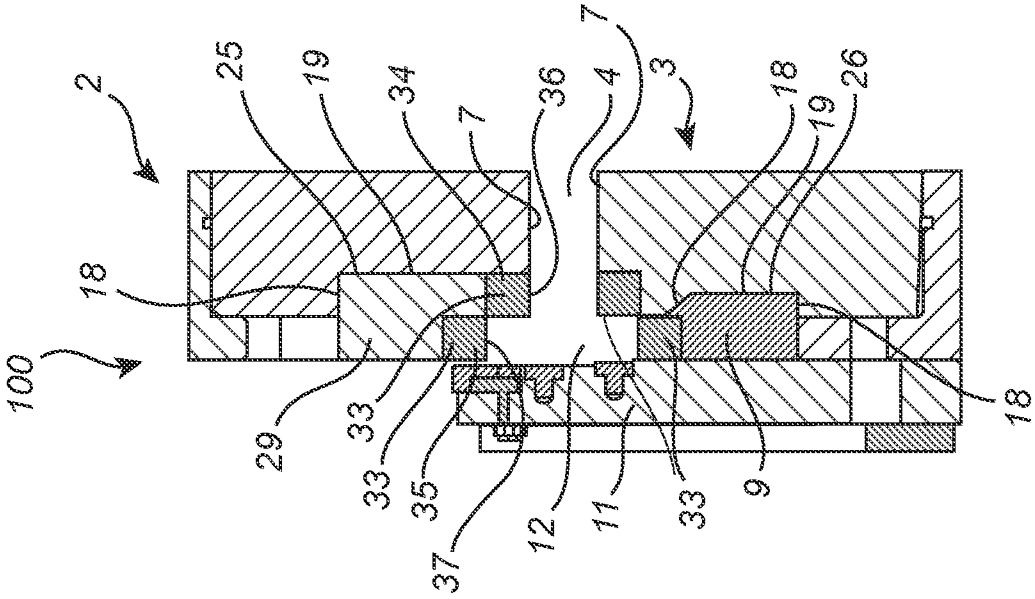

Referring now to FIGS. 8A-B, a grinding assembly comprising first and second grinding rolls 2, 3 wherein the first grinding roll 2 comprises edge ring segments as that shown in FIG. 5 and FIGS. 7A-C is illustrated during its operation. In FIG. 8A, the grinding assembly is shown prior to operation. In this embodiment, the second roll 3 comprises the flange 11, arranged thereat as previously described. The first grinding roll 2 comprises an edge ring made up of a plurality of edge ring segments 29 as that shown in FIG. 5 and FIGS. 7A-C. The edge ring segments 29 are received in a side groove 25 as shown in FIG. 4, providing a support shoulder 18 recessed from the cylindrical outer surface 7 as well as from the end surface 8 of the roll body 6. Furthermore, the second grinding roll 3 also comprises an edge ring made up of a plurality of edge ring segments 29 as that shown in FIG. 5 and thus having the same structure as that of the first grinding roll 2.

During operation, material build-up 50 will form in the corner between the stepped configuration of the wear members 33 of the second grinding roll and the inner surface of the flange 11 of the second grinding roll 3, as shown in FIG. 7B. During further operation, the stepped configuration of the wear members 33 of the first grinding roll 2 provides a pocket to hold material and build an autogenous layer 51 which copies the shape of the material build-up 50 on the second grinding roll 3. Due to the decreasing pressure between the grinding rolls 2, 3 towards the ends thereof, the shape of the material build-up or autogenous layer 50, 51 is generally triangular in cross-section. The autogenous layer protects the surface of the wear members 33 of the first and second grinding rolls 2, 3 from wear. The so formed autogenous layers 50, 51 thus provide angled wear protecting surfaces of the first and second grinding roll 2, 3.

Figure 9:
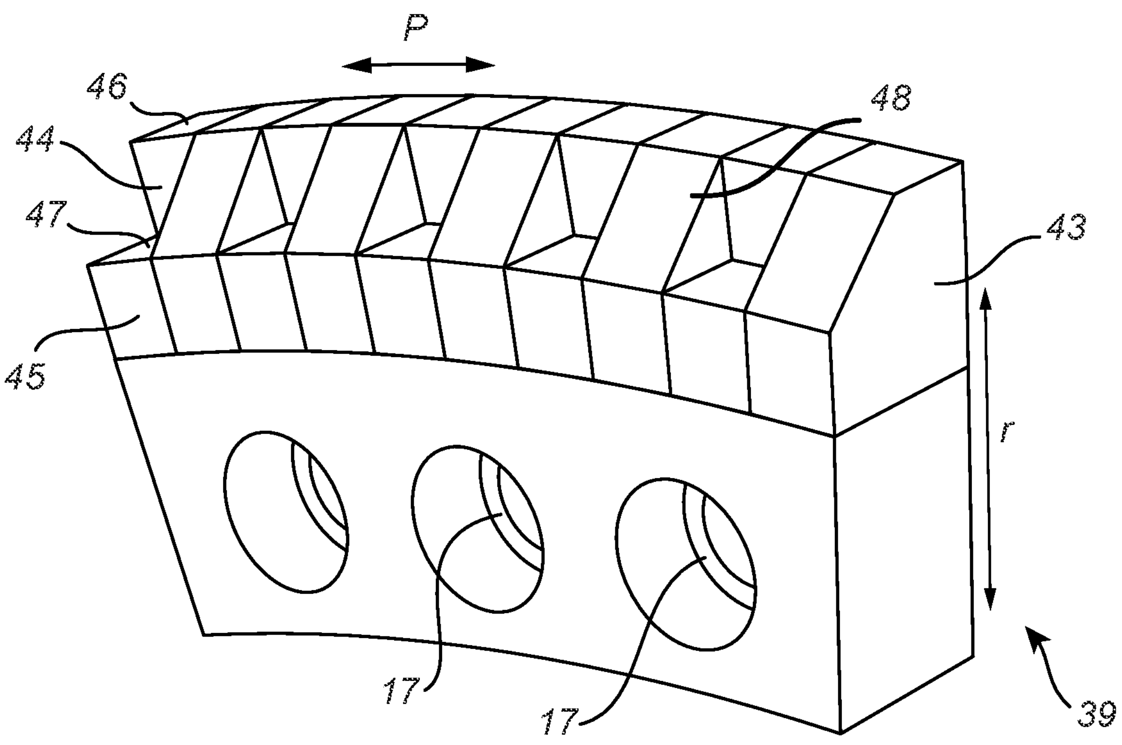
FIG. 9 is a schematic perspective view of an edge ring segment according to another embodiment of the disclosure.

FIG. 9 illustrates another edge ring segment 39 comprising wear members 43 provided in a stepped configuration. Here, each wear member has an L-shape, similar to that of FIG. 6. It is clear that a design similar to that of FIG. 5 is also possible, having wear elements arranged in a stepped configuration. The wear members 43 are arranged in an end-to-end configuration and provide a first and a second portion 44, 45. Similar to the embodiment shown in FIG. 5, the first portion 44 comprises a surface 46 providing a first step which forms an edge of the edge ring segment 29 extending along the peripheral extension p thereof. The second portion 45 comprises a surface 47 providing a second step which forms an edge arranged radially inwards of the first step and which extends in the peripheral extension p of the edge ring segment 29. In addition, sloping elements 48 are arranged on the surface 47. The sloping elements are arranged with a distance between them, thus creating pockets therebetween. These pockets will during use be filled with material creating a stronger autogenous layer which is prevented from moving in a circumferential direction.

Figure 10:
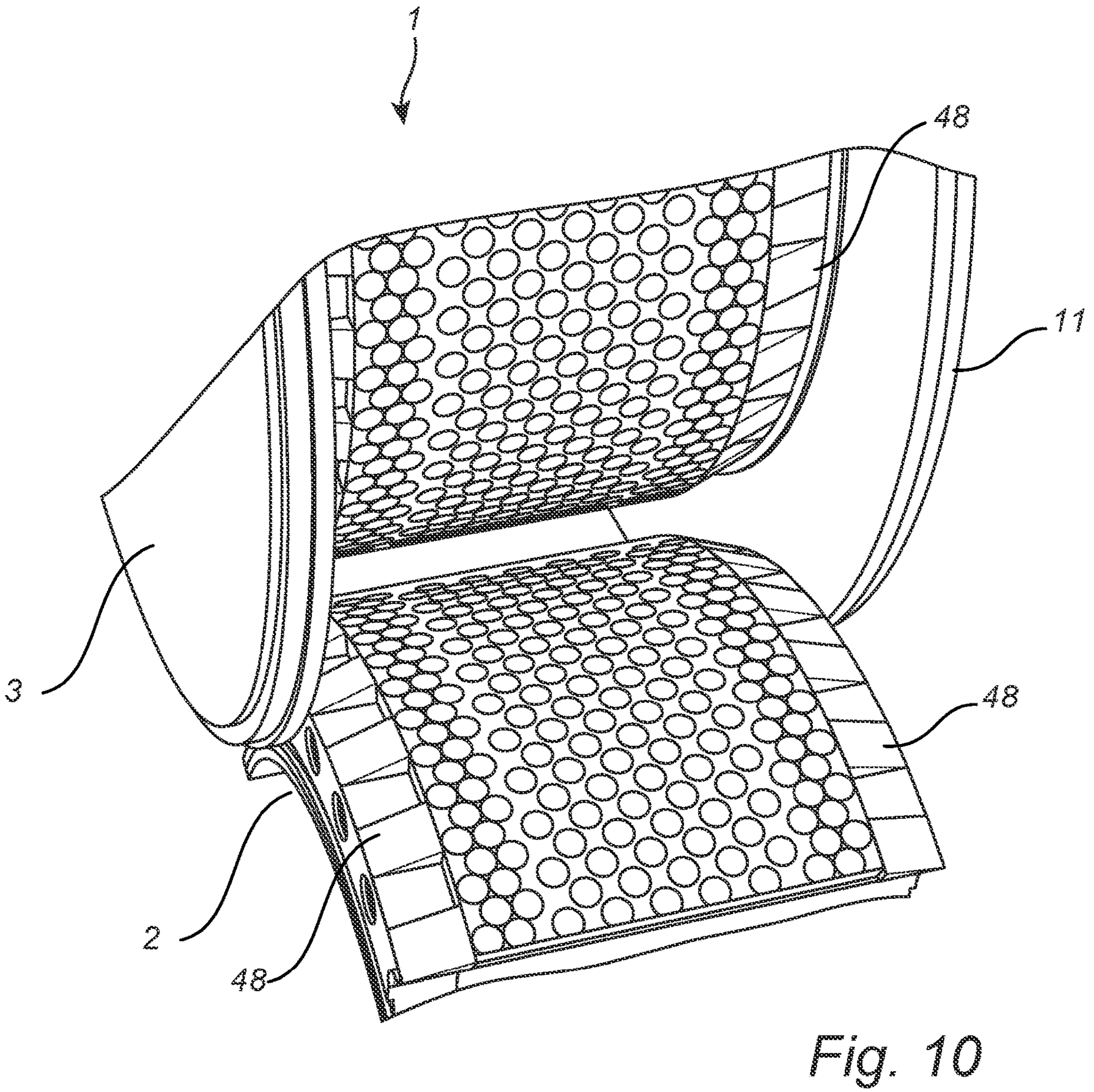
FIG. 10 is a perspective view of a grinding assembly in accordance with an embodiment of the disclosure.

FIG. 10 discloses a grinding assembly 1 in which both grinding rolls 2, 3 are provided with edge ring segments comprising sloping elements 48 as described in FIG. 9. This design provides improved retention of material creating a strong autogenous layer protecting the grinding rolls and flanges 11. It is clear that such sloping elements can be provided on only one of the grinding rolls 2, 3 and be combined with any of the other edge ring designs as defined in FIGS. 3-8B.

The skilled person realizes that a number of modifications of the embodiments described herein are possible without departing from the scope of the disclosure, which is defined in the appended claims.

The invention claimed is:

1. A grinding roll comprising a roll body having a cylindrical outer surface extending axially between a pair of opposite ends;

a side groove formed at each end of the roll body, the side groove including a support shoulder recessed from the cylindrical outer surface and/or from surfaces of the opposite ends of the roll body;

an edge ring including a plurality of spaced receiving cavities; and a plurality of wear members each received and retained in at least one of the receiving cavities of the edge ring, wherein the wear members are positioned along the edge ring to define an edge of the grinding roll, wherein the edge ring is received within each side groove, wherein the plurality of wear members is arranged to provide a wear protecting surface which is angled in relation to the cylindrical outer surface of the roll body, and wherein the plurality of wear members is provided in a stepped configuration, each wear member having a first portion and at least a second portion, wherein the first portion is arranged to be aligned with and adjacent an end of the cylindrical outer surface, and the at least second portion is aligned with an end surface of the roll body and arranged radially inwards of the first portion, wherein the angled wear protecting surface is formed between the first and second portions.

2. The grinding roll according to claim 1, wherein the edge ring is formed from a plurality of edge ring segments.

3. The grinding roll according to claim 1, wherein the side grooves are arranged to provide the support shoulders recessed from each of the opposite end surfaces of the roll body.

4. The grinding roll according to claim 1, wherein the side grooves are arranged to provide the support shoulders recessed from the cylindrical outer surface as well as from each opposite end surface of the roll body.

5. The grinding roll according to claim 1, wherein the plurality of wear members is arranged in at least two rows on each edge ring, a first row being aligned with and adjacent an end of the cylindrical outer surface, and a second row being aligned with an end surface of the roll body and arranged radially inwards of the first row.

6. A grinding assembly for comminution of material, comprising parallel first and second grinding rolls arranged to rotate in opposite directions, towards each other, and separated by a gap, wherein each of the first and second grinding rolls comprises:

a roll body having a cylindrical outer surface extending axially between a pair of opposite ends;

a side groove formed at each end of the roll body, the side groove including a support shoulder recessed from the cylindrical outer surface and/or from surfaces of the opposite ends of the roll body;

an edge ring including a plurality of spaced receiving cavities; and a plurality of wear members each wear member being received and retained in at least one of the receiving cavities of the edge ring, wherein the wear members are positioned along the edge ring to define an edge of the grinding roll, wherein the edge ring is received within each side groove, wherein the first grinding roll comprises a flange ring at each opposite end, said flanges each having an outer edge that extends radially past the cylindrical outer surface of the roll body, and wherein the plurality of wear members of each of the first and second grinding rolls is arranged to provide a wear protecting surface which is angled in relation to the cylindrical outer surface of the respective roll body, and wherein the wear protecting surface provided by the wear members of the first grinding roll slopes downwards in a direction towards a center of the roll body and wherein the wear protecting surface provided by the wear members of the second grinding roll slopes radially downwards in a direction towards the end of the roll body.

7. The grinding assembly according to claim 6, wherein the plurality of wear members of the first grinding roll is arranged to provide the wear protection surface that is angled in relation to the cylindrical outer surface of the first roll body and which partly protrudes beyond the cylindrical outer surface of the roll body and which slopes downwards in a direction towards a center of the roll body, and the plurality of wear members of the second grinding roll is arranged to provide the wear protection surface that is angled in relation to the cylindrical outer surface of the second roll body and which does not protrude beyond the cylindrical outer surface of the roll body and which slopes radially downwards in a direction towards the end of the roll body.

8. The grinding assembly according to claim 6, wherein the plurality of wear members of the first grinding roll is aligned with the cylindrical outer surface of the roll body; and wherein the plurality of wear members of the second grinding roll is provided in a stepped configuration, wherein the plurality of wear members of the second grinding roll are arranged to provide a first portion and at least a second portion, wherein the first portion is arranged to be aligned with and adjacent an end of the cylindrical outer surface, and the at least second portion is aligned with an end surface of the roll body and arranged radially inwards of the first portion.

9. The grinding assembly according to claim 8, wherein the plurality of wear members of the second grinding roll is arranged in at least two rows on the edge rings, a first row being aligned with and adjacent an end of the cylindrical outer surface forming the first portion, and a second row being aligned with an end surface of the roll body and arranged radially inwards of the first row forming the second portion.

10. A grinding roll comprising a roll body having a cylindrical outer surface extending axially between a pair of opposite ends;

a side groove formed at each end of the roll body, the side groove including a support shoulder recessed from the cylindrical outer surface and/or from surfaces of the opposite ends of the roll body;

an edge ring including a plurality of spaced receiving cavities; and a plurality of wear members each received and retained in at least one of the receiving cavities of the edge ring, wherein the wear members are positioned along the edge ring to define an edge of the grinding roll, wherein the edge ring is received within each side groove, wherein the plurality of wear members is arranged in a stepped configuration, wherein the plurality of wear members are arranged to provide a first portion and at least a second portion, wherein the first portion is arranged to be aligned with and adjacent an end of the cylindrical outer surface, and the at least second portion is aligned with an end surface of the roll body and arranged radially inwards of the first portion, wherein the plurality of wear members are arranged to provide an angled wear protecting surface that is formed between the first and second portions.

11. A grinding roll according to claim 10, wherein the plurality of wear members is arranged in at least two rows on each edge ring, a first row being aligned with and adjacent an end of the cylindrical outer surface forming the first portion, and a second row being aligned with an end surface of the roll body and arranged radially inwards of the first row forming the second portion.

12. An edge ring segment arrangeable at a grinding roll along an edge thereof, the edge ring segment comprising:

a plurality of spaced receiving cavities: and a plurality of wear members, each wear member being received and retained in at least one of the receiving cavities of the edge ring segment, wherein the wear members are positioned along the edge ring segment to define an edge of the grinding roll when arranged thereat, and wherein the plurality of wear members is arranged in a stepped configuration, wherein a first portion of each wear member comprises a surface which is aligned with and adjacent an end of the cylindrical outer surface of the grinding roll and a second portion of each wear member protrudes axially from the first portion and is aligned with an end surface of the grinding roll, and is arranged radially inwards of the first portion, wherein the plurality of wear members are arranged to provide an angled wear protecting surface that is formed between the first and second portions.

13. The edge ring segment according to claim 12, wherein the plurality of wear members is arranged in at least two rows on the edge ring segment, such that, when the edge ring segment is arranged at a grinding roll having a cylindrical outer surface extending between a pair of opposing ends, a first row is aligned with and adjacent an end of the cylindrical outer surface of the grinding roll forming the first portion, and a second row is aligned with an end surface of the grinding roll and arranged radially inwards of the first row forming the second portion.

* * * * *